US008240898B2

(12) United States Patent
Teramoto et al.

(10) Patent No.: US 8,240,898 B2
(45) Date of Patent: Aug. 14, 2012

(54) DOOR MIRROR INCLUDING FRESNEL LENS

(75) Inventors: Hiroshi Teramoto, Yaizu (JP); Ryo Yasumoto, Aichi (JP)

(73) Assignee: Murakami Corporation, Shizuoka (JP)

( * ) Notice: Subject to any disclaimer, the term of this patent is extended or adjusted under 35 U.S.C. 154(b) by 358 days.

(21) Appl. No.: 12/618,911

(22) Filed: Nov. 16, 2009

(65) Prior Publication Data
US 2010/0165651 A1    Jul. 1, 2010

(30) Foreign Application Priority Data

Dec. 25, 2008   (JP) ................................ 2008-330099

(51) Int. Cl.
*B60Q 1/24* (2006.01)
(52) U.S. Cl. ......... 362/522; 362/494; 362/495; 362/501
(58) Field of Classification Search .................. 362/494, 362/495, 501, 503, 522
See application file for complete search history.

(56) References Cited

U.S. PATENT DOCUMENTS

| 5,825,636 A | * | 10/1998 | Kuroki et al. | ................. 362/309 |
| 6,074,077 A | * | 6/2000 | Pastrick et al. | ............... 362/494 |
| 6,290,378 B1 | * | 9/2001 | Buchalla et al. | .............. 362/494 |

FOREIGN PATENT DOCUMENTS

| JP | 3-080619 | 10/2001 |
| JP | 2006-007883 | 1/2006 |
| JP | 2008-094314 | 4/2008 |
| JP | 2008-132875 | 6/2008 |

OTHER PUBLICATIONS

U.S. Appl. No. 12/619,743 to Atsushi Watanabe, which was filed on Nov. 17, 2009.

* cited by examiner

*Primary Examiner* — Stephen F Husar
*Assistant Examiner* — James Cranson, Jr.
(74) *Attorney, Agent, or Firm* — Greenblum & Bernstein P.L.C.

(57) ABSTRACT

On the surface of Fresnel lens part which is formed on the back face of the lens in a door mirror, grain is provided. This grain includes the first grain formed in the first area positioned in the outside of the boundary extending in the front and rear direction of a vehicle, and the second grain formed in the second area positioned in the door panel side of the boundary, and the concavity depth of the second grain is deeper than that of the first grain. Consequently, illumination intensity of the light irradiated toward the face of the door panel from the deeper grain side of the second area can be reduced compared with the illumination intensity of the light toward the footstep from the shallower grain side of the first area. Adoption of such lens makes possible to apply in the various vehicle models through changing only the boundary position and concavity depth of the grain on the face of the Fresnel lens part.

3 Claims, 7 Drawing Sheets

DOOR MIRROR INCLUDING FRESNEL LENS

CROSS-REFERENCE TO RELATED APPLICATION

The disclosure of Japanese Patent Application No. JP2008-330099 filed on Dec. 25, 2008 including the specification, drawings and abstract is incorporated herein by reference in its entirely.

BACKGROUND OF THE INVENTION

1. Field of the Invention

The present invention relates to a door mirror provided with a lamp to illuminate footstep under the outside of door panel of a vehicle.

2. Related Background of the Invention

As a technical art in this field heretofore, there has been Japanese Unexamined Patent Application No. 2008-94314. The door mirror described in the patent document is provided with a lamp to illuminate footstep under the outside of door panel of a vehicle. The lamp is installed in a lamp socket, which is fit to a lamp housing of the door mirror in detachable manner. A reflection plate is fixed in the lamp housing, and the light reflected by the reflection plate can illuminate outside of the door panel through a lamp window (lens). The door mirror provided with the foot lamp can illuminate footstep under the outside door panel to support getting on and off of a passenger while the vehicle is in standing position in the dark. Note that there are other technical arts described in Japanese Unexamined Patent Application No. 2008-132875, Japanese Utility Model No. 3080619, or Japanese Unexamined Patent Application No. 2006-7883.

SUMMARY OF THE INVENTION

However, when a passenger approaches a vehicle for getting on, if the door panel surface glistens with a lamp of the door mirror, it becomes hard for a passenger to have a bright footstep under the outside of door panel due to the fact that the light of door panel side is glistened intensively. No counter measure against this problem has been taken in the conventional door mirror. In the conventional door mirror, in order to weaken the light glistening on the door panel, various structure changes are required such as change of reflection plate inclination or specification thereof, change of optical axis of the lamp and the like for each vehicle model, accordingly great design change is obliged to implement.

The present invention provides a door mirror which is arranged so that the light illuminating the door panel can be weakened easily.

The present invention is for a door mirror comprising a lamp to illuminate a footstep under the outside of a door panel of a vehicle, the lamp is disposed in a door mirror body; and a lens which is fit in the door mirror body to diffuse light of the lamp, the lens includes a Fresnel lens part in which a plurality of parallel steps are formed at back side of the lens and a boundary extending in substantially front and rear direction of the vehicle on the surface of the Fresnel lens part; wherein in the surface of the Fresnel lens part, a first grain is formed in a first area which is positioned outside of the boundary and a second grain is formed in a second area which is positioned in the door panel side of the boundary, and wherein concavity depth of the second grain is made deeper with respect to concavity depth of the first grain.

In this door mirror, grain is provided in the surface of the Fresnel lens part which is formed in the back face of the lens. This grain has the first grain which is formed in the first area positioned outside of the boundary extending in the front and rear direction of the vehicle, and the second grain which is formed in the second area located at the door panel side of the boundary, and the concavity depth of the second grain is made deeper than that of the first grain. Consequently, the light irradiated from the lens is divided into the light to the door panel side and the light to the footstep side having separation at the boundary extending in the front and rear direction of the vehicle, hence the illumination intensity of the light irradiated toward the door panel surface from the second area which is the deeper grain side can be reduced compared to the illumination intensity of the light irradiated toward the footstep from the first area which is the shallower grain side. Adoption of a lens having such constitution can make feasible the application to various vehicle models, only through change of the boundary position and the concavity depth of grain on the surface of Fresnel lens part. In this way, simple design change of lens can weaken the light glistening on the door panel so that the light in the footstep side is emphasized to give bright feeling to a passenger around the footstep side. In addition, the grain on the surface of the Fresnel lens part makes the lamp hardly observed from outside to avoid full exposition of the lamp, accordingly outward appearance of door mirror is enhanced.

Moreover, it is preferable that a shooting window of a camera is provided in the second area in which the second grain is formed. When the illumination intensity is high around the camera shooting window, such an occasion may occur that the image of camera becomes whitish. In the present invention, the camera shooting window is disposed in the second area so that such occasion hardly occurs. Furthermore, since the camera shooting window is disposed in the door panel side, the image of the side of the vehicle can be securely obtained.

DESCRIPTION OF THE PREFERRED EMBODIMENTS

Hereinafter, preferred embodiments of door mirror according to the present invention will be described in detail referring to drawings. Note that the identical or equivalent structure is given the same symbols and the description thereof is omitted.

Figure 1:
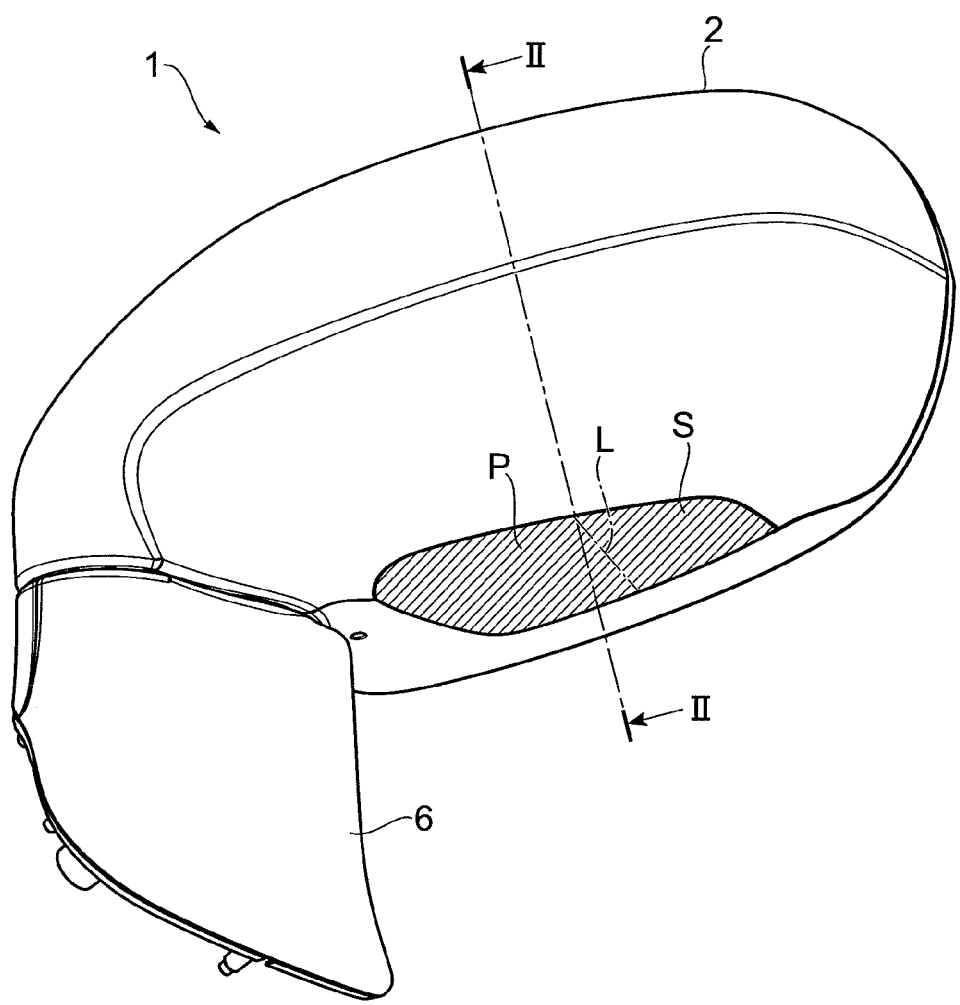
FIG. 1 is a perspective view showing an embodiment of a door mirror according to the present invention.
Figure 2:
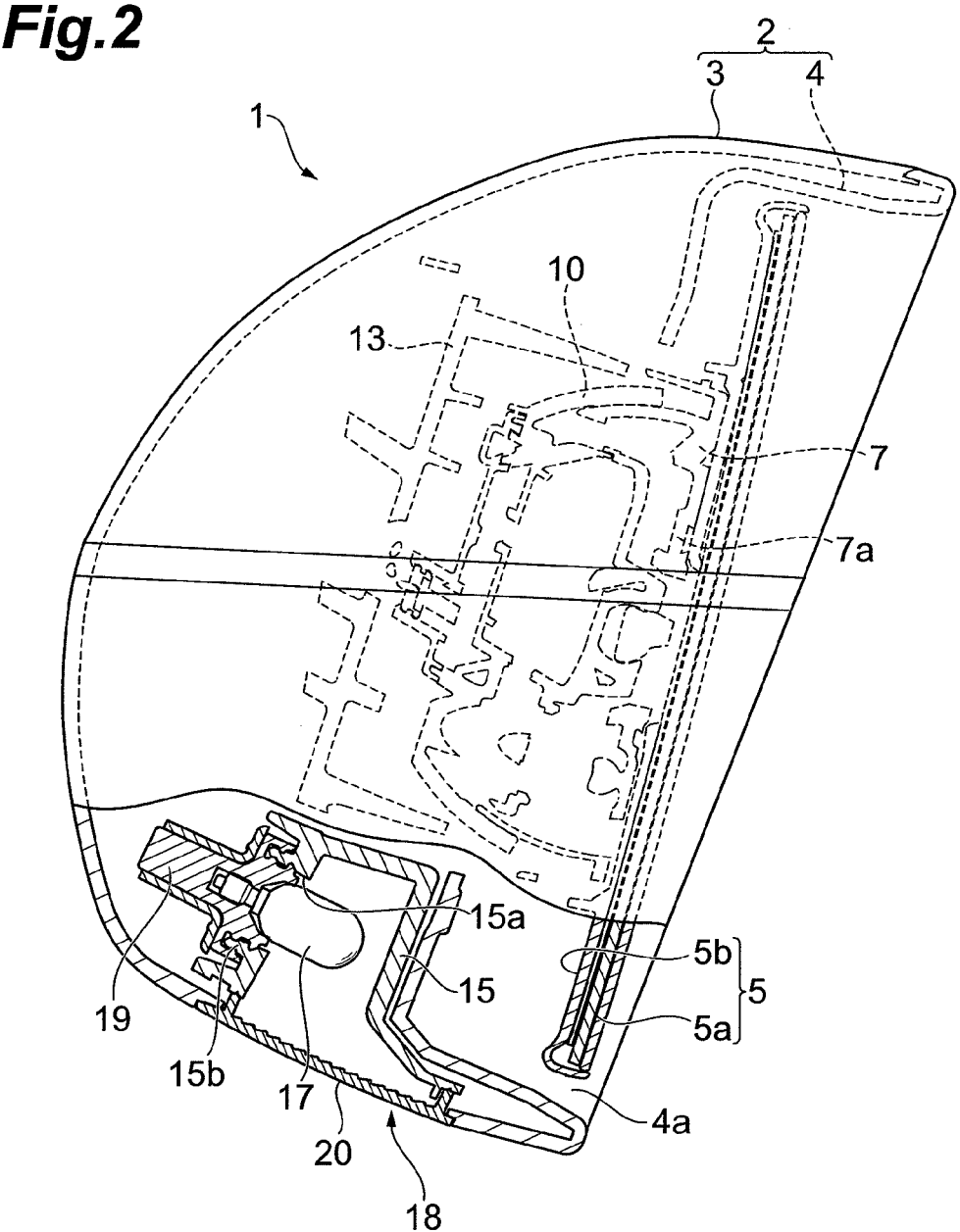
FIG. 2 is a partial cross-section view along the line II-II of FIG. 1

As shown in FIGS. 1 and 2, a door mirror 1 is provided with a bowl-shaped plastic door mirror body 2 which is fixed to a front side door panel 30 (see FIG. 5) via an arm part 6. This door mirror body 2 comprises a casing 3 which has an opening that is opened toward rear part side of a vehicle M, and a cup-shaped separating plate 4 which is fixed to the casing 3 just like embedded manner in the opening of the casing 3.

A reflection mirror 5 is disposed in the door mirror 1 so that a concave part 4a which is provided in the separating plate 4 is covered with the reflection mirror 5. This reflection mirror 5 has a mirror plate 5a and a plastic mirror holder 5b which holds the mirror plate 5a, and four claw pieces, which is not shown, are provided in the mirror holder 5b. Moreover, the reflection mirror 5 is installed in detachable manner against a pivot plate 7.

This pivot plate 7 has a disc 7a which is abutted on the back face of the mirror holder 5b of the reflection mirror 5, and four claw hook stoppers (not shown) which are disposed in the periphery of the disc 7a at equal spaces. Four plastic-made claws which are provided in the back face of the reflection mirror 5 are caught by each claw hook stopper. Accordingly, the reflection mirror 5 is detachable from the pivot plate 7 and the reflection mirror 5 can be removed easily from the pivot plate 7 by pulling the reflection mirror 5 strongly to the near side.

Further, two sphere-shaped concave portions (not shown) are formed in a back face side of the pivot plate 7, and each concave portion is connected with a sphere portion (not shown) which is provided on the head of adjuster nut (not shown) in a ball-joint structure. Each adjuster nut is screwed in two adjuster bolts (not shown) respectively which are erected on the cup-shaped holder 10, and each one moves in the axial direction independently while turning on its own axis by an actuator (not shown) which is combination of a motor and gears. And the variation of independent moving amount of each respective adjuster nut can change the angle of pivot plate 7, and in accordance with that, the reflection mirror 5 can be inclined to the predetermined mirror face angle.

The actuator and the holder 10 are fixed to the interior frame 13 which is fit to the casing 3. A lamp housing 15 to accommodate a lamp 17 is fixed under this interior frame 13. An insertion opening 15a is formed in the lamp housing 15 to allow the insertion of the lamp 17.

Around the periphery of the insertion opening 15a is formed a cylindrical part 15b, and a lamp socket 19 is fit at the rear part of the lamp 17. Since the lamp socket 19 is detachable from the cylindrical part 15b, the lamp 17 can be replaced with the new one simply by pulling out the lamp socket 19 even when the lamp filament is burnt out.

Furthermore, a lamp window 18 is provided in the lower part of the door mirror body 2, and a plastic-made lens 20 is embedded in the lamp window 18. Owing to this lens 20, the light from the lamp 17 can be diffused so that the wide range of ground can be illuminated.

Figure 3:
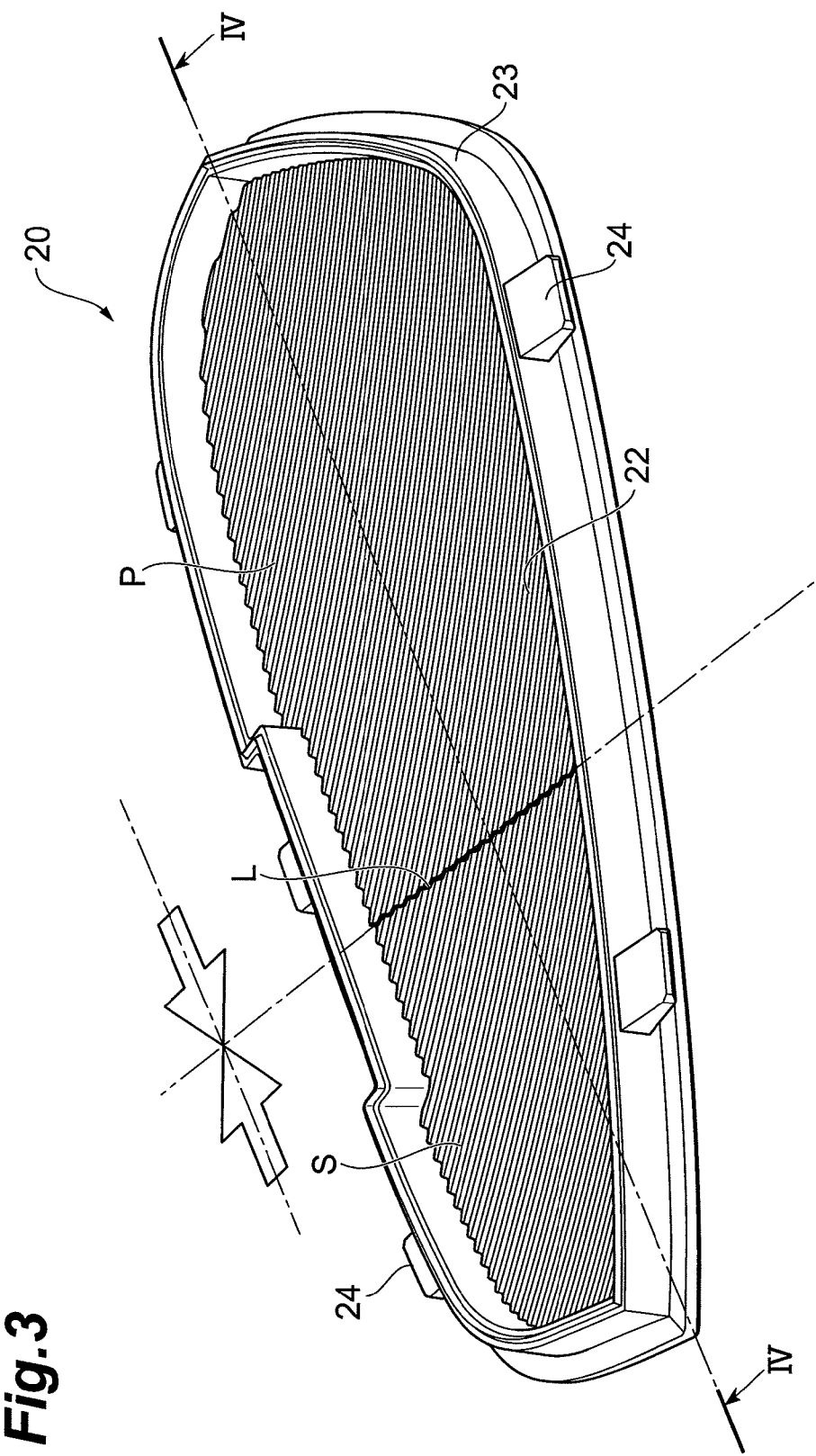
FIG. 3 is a perspective view showing a lens.
Figure 4:
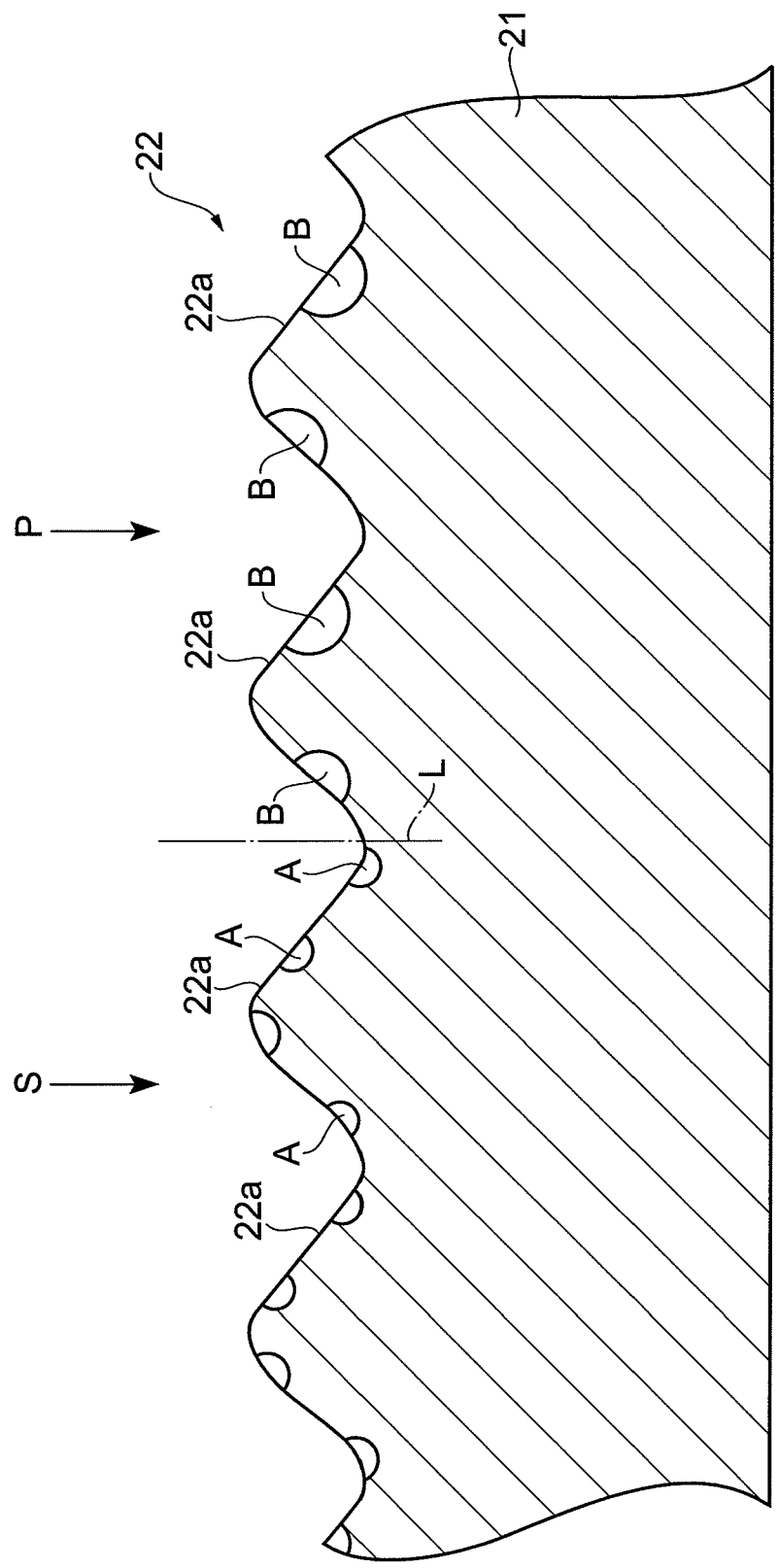
FIG. 4 is a partially enlarged section view along the line IV-IV of FIG. 3.

As shown in FIGS. 3 and 4, the lens 20 installed in the lower part of the door mirror body 2 in substantially horizontal state has a lens body part 21 extending in plate-like state on a substantially horizontal plane, an enclosing wall 23 which is erected around the periphery of the lens body 21, and tongue pieces 24 protruding from the enclosing wall 23 in the side direction. The front face side of the lens body 21 is formed to be a smooth surface, and on the back face side of the lens body 21, a saw teeth-state Fresnel lens part 22 is formed.

The Fresnel lens part 22 is called a lens cut part, too, which has a function of wide range illumination through refraction of the light. In the Fresnel lens part 22, steps 22a which have almost equal shapes of ridges arranged with equal distance extending in parallel with each other. Since graining process has been performed in the surface of each step 22a, thin and long parallel lines caused by the shapes of the steps 22a are prevented from being imaged on the ground when the light is turned on, and the full exposition of the lamp 17 through the lamp window 18 is prevented. In addition, grain process on the Fresnel lens part 22 contributes to the prevention of unevenness appearance of light and shade of the Fresnel lens part 22.

On the surface of the Fresnel lens part 22, there is a boundary L extending in the front and rear direction of the vehicle M in substantially parallel to the center line of the vehicle, and the first grain A is formed in the first area S positioned outside of the boundary L and the second grain B is formed in the second area P positioned in the side of door panel 30 of the boundary L.

The depth of concavity of the second grain B is deeper than the depth of concavity of the first grain A. For example, in the present embodiment, supposing the depth of concavity of the first grain A is made to be 20 and the depth of concavity of the second grain is 40 μm. Such grain A and B are formed in dies and when the injection process of the lens 20 is performed, grain is molded simultaneously.

Note that the position of the boundary L is changed suitably according to the vehicle model. The grain shown in FIG. 4 is depicted schematically.

Experimental result of the door mirror 1 which adopts the lens 20 having such constitution will be described hereafter. Note that a lamp 17 having specification of 12V-5 W is used.

Figure 5:
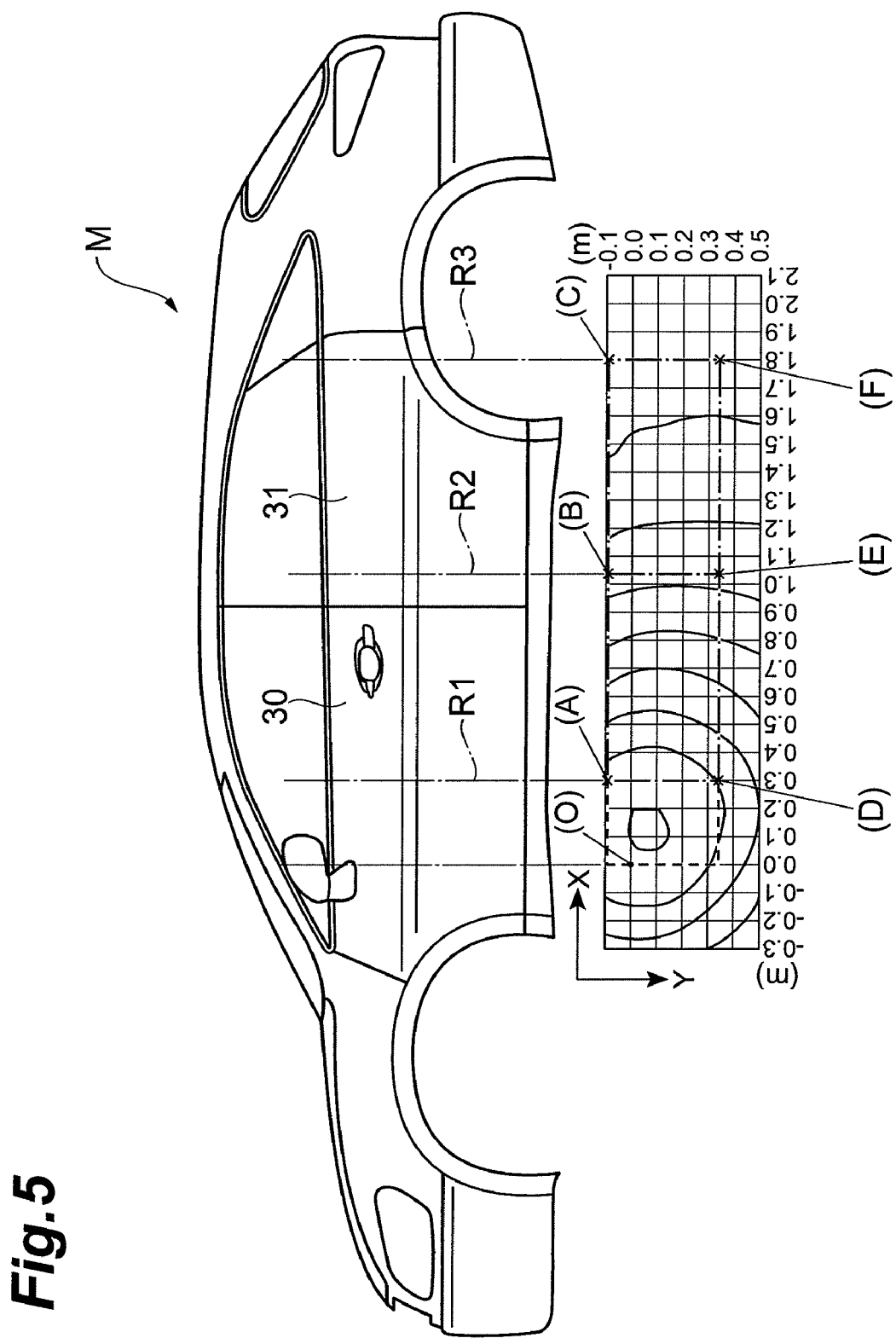
FIG. 5 is a chart showing the illumination intensity distribution of a door mirror according to the present invention.

FIG. 5 shows a illumination intensity distribution which is presented by X-axis extending in parallel to the center line extending in the front and rear direction of the vehicle M and Y-axis which is perpendicular thereto, having the origin (0) at the spot on the ground when hung down vertically from the center of the lens 20.

As recognizable clearly in FIG. 5, in such a vehicle model as the front door panel 30 and the rear door panel 31 are positioned within 100 mm inside from the directly below the center of the lens 20, the illumination intensity was measured on the line R1 passing substantially center of the front door panel 30, on the line R2 passing the front side of the rear door panel 31, and on the line R3 passing the rear side of the rear door panel 31.

In this illumination intensity distribution, measurements were carried out at the points (A), (B), (C) on the surface of each door panel 30, 31, and at the points of (D), (E), (F), which are 345 mm separated on the ground from the X-axis that passes the origin (0). By the way, (A) and (D) are separated about 300 mm from the Y-axis that passes the origin (0), and (B) and (E) are separated about 1,060 mm, and (C) and (F) are separated about 1,850 mm.

As a result, the illumination intensity was 8.2 lux at (A), 3.0 lux at (B), 1.1 lux at (C), 8.2 lux at (D), 3.8 lux at (E), and 1.7 lux at (F).

On the contrary, such a lens was produced as a comparison example that grain having 20 μm depth of concavity was formed evenly on the whole surface of the Fresnel lens part 22 without any boundary, and the illumination intensity was measured at the point of (A), (B), (C), (D), (E) and (F).

As a result, the illumination intensity was 8.6 lux at (A), 3.6 lux at (B), 1.5 lux at (C), 8.2 lux at (D), 3.8 lux at (E) and 1.7 lux at (F).

Judging from the above results, in a case using the lens 20 according to the present invention, the illumination intensity was reduced by 0.4 lux at (A), reduced by 0.6 lux at (B) and reduced by 0.4 lux at (C), but reduction of illumination intensity was not observed at (D), (E) and (F).

As described so far, it is understood that the door mirror 1 according to the present invention which utilizes the lens 20 drops only the illumination intensity on the side of the door panel 30, 31, without dropping the illumination intensity on the ground around the passenger's footstep. In addition, there is very little illumination intensity drop at the points of (A), (B) and (C), consequently slight illumination intensity drop on the surface of the door panel 30, 31 can make passenger feel that the light at footstep under the outside of the door panel 30, 31 is bright, and furthermore, the passenger can feel the glistening light on the door panel 30, 31 to be soft one, moreover the glistening light on the door panel 30, 31 can be expected to play as a stage effect as well.

In this door mirror 1, grain is provided on the surface of the Fresnel lens part 22 formed in the back face of the lens 20. The grain has the first grain A formed in the first area S positioned outside of the boundary L which extends in the front and rear direction of the vehicle M, and the second grain B formed in the second area P positioned in the door panel 30, 31 side of the boundary L, and the depth of concavity of the second grain B is arranged to be deeper than that of the first grain A. Consequently, the light irradiated from the lens 20 are split into the light for the door panel 30, 31 side and the light for footstep side, separating at the boundary L which extends in the front and rear direction of the vehicle M. Thus, the illumination intensity of the light toward the surface of the door panel 30, 31 side irradiated from the second area P of the deeper grain side can be reduced compared with the illumination intensity of the light toward the footstep side irradiated from the first area S of the shallower grain side.

Adoption of the lens 20 having such constitution can make feasible to apply to various vehicle models, simply with change of the boundary position and the concavity depth of grain on the surface of Fresnel lens part 22. In this way, simple design change of lens 20 can weaken the light glistening on the door panel 30, 31 so that the light in the footstep side is emphasized to give a passenger bright feeling around the footstep side. In addition, the grain on the surface of the Fresnel lens part 22 makes the lamp 17 hardly observed from outside, avoiding full exposition of the lamp 17, accordingly external appearance of door mirror 1 is enhanced.

It is needless to say that the present invention is not limited to aforementioned embodiments.

It is needless to say that the present invention can be applied to a door mirror which is provided with a reflector inside the lamp housing 15. The concavity depth of the second grain B may be changed suitably according to the vehicle model or the color of the vehicle M, and for the purpose of illumination intensity reduction on the door panel 30, 31, it is sufficient to consider design change to deepen the concavity depth of the second grain B. Moreover, the position of the boundary L may be suitably changed considering the distance between the center of the lens 20 and the door panel 30, 31. In addition, the boundary L is not limited to be straight line always but may be wave shape, saw teeth shape, or curved shape substantially tracing the profile of the door panel 30. Further, the boundary L may be arranged to be diagonal against the vehicle center line extending in the front and rear direction of the vehicle M.

As far as the present invention is concerned, the boundary L extends substantially in the front and rear direction of the vehicle M, but the case where the boundary L extends diagonally in the range from 0 degree to less than 45 degrees with respect to the vehicle center line is applicable to the purpose. The boundary L which is defined to reduce the light illuminating the door panel 30 may extend in substantially width direction of the vehicle M, but the case where the boundary L extends diagonally in the range from 45 degrees to approximately less than 90 degrees with respect to the vehicle center line is applicable to the purpose.

Figure 6:
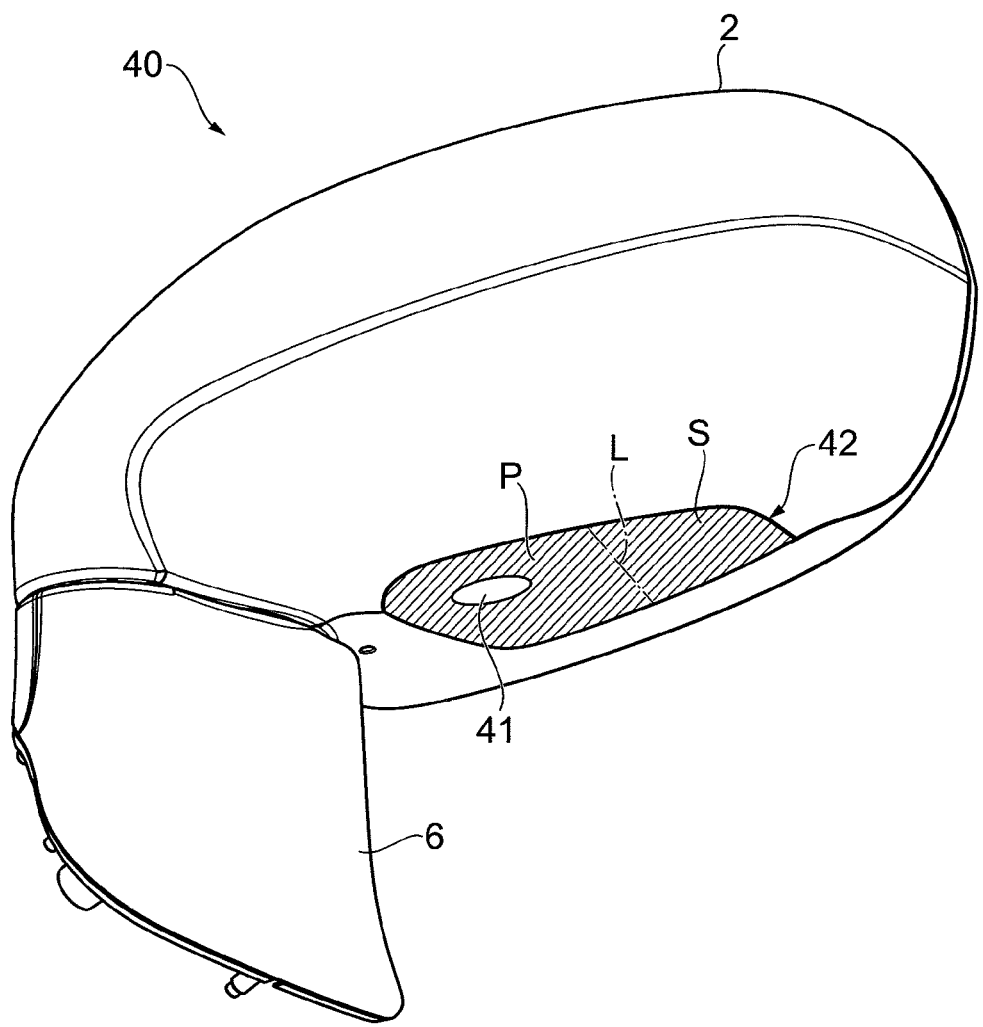
FIG. 6 is a perspective view showing another embodiment of a door mirror according to the present invention.

Moreover, as shown in FIG. 6, the lens 42 in another door mirror 40 may be provided with the camera shooting window 41 in the second area P where the second grain B is formed. When the luminous intensity around the camera shooting window 41 is high, such a situation may happen that the image of the camera may become whitish. Thereby, in the present invention, the camera shooting window 41 is disposed in the second area P so that such situation is hardly happen. In addition, the camera shooting window 41 is disposed in the side of the door panel 30, hence the side of the vehicle M can be securely imaged.

Figure 7:
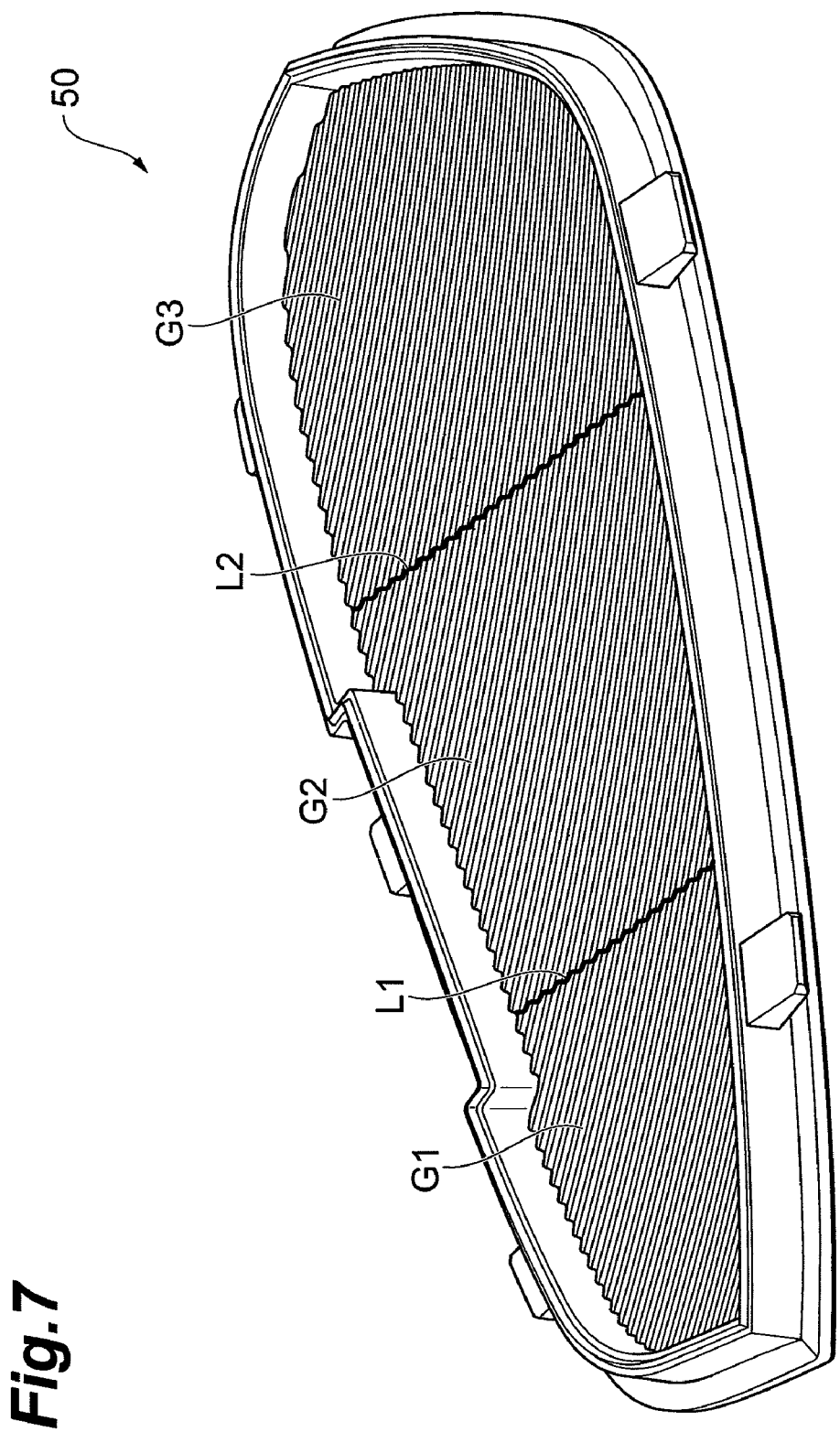
FIG. 7 is a perspective view showing a modified example of a lens applied in a door mirror according to the present invention.

Even a plurality of boundaries as well can achieve the expected aim of the present invention, and when the boundaries split the area into small segments, the illumination intensity can be set incrementally. As shown in FIG. 7 for example, boundaries L1 and L2 can be placed side by side in another lens 50. In this case, with respect to the boundary L1, shallow grain area G1 is provided in the outside of the L1, deeper grain area G2 than the area G1 is provided in the side of the door panel 30, and further with respect to the boundary L2, deeper grain area G3 than the area G2 is provided in the side of the door panel 30, resultantly shallower grain area G2 than the area G3 in the outside area. That is to say, the grain becomes deeper sequentially in the order of area G1, G2, and G3 in the above described lens.

According to the present invention, the light irradiated on the door panel can be reduced easily.

What is claimed is:

1. A door mirror comprising:
    a lamp to illuminate a footstep under an outside of a door panel of a vehicle, the lamp is disposed in a door mirror body; and
    a lens fitted in the door mirror body to diffuse light of the lamp, the lens includes a Fresnel lens part in which a plurality of parallel steps are formed at a back side of the lens and a boundary extending in substantially a front and rear direction of the vehicle on the surface of the Fresnel lens part;
    wherein in the surface of the Fresnel lens part, a first grain is formed in a first area which is positioned outside of the boundary and a second grain is formed in a second area which is positioned in the door panel side of the boundary, and
    wherein a concavity depth of the second grain is made deeper with respect to a concavity depth of the first grain.

2. The door mirror according to claim 1, wherein a camera shooting window is provided in the second area in which the second grain is formed.

3. The door mirror according to claim 1, wherein a surface of each of the plurality of parallel steps is provided with the concavity of one of the first grain and the second grain.

* * * * *